(12) United States Patent
Heuck et al.

(10) Patent No.: US 10,890,745 B2
(45) Date of Patent: Jan. 12, 2021

(54) MIRAU INTERFERENCE OBJECTIVE

(71) Applicant: LEICA MICROSYSTEMS CMS GMBH, Wetzlar (DE)

(72) Inventors: Hans-Martin Heuck, Wetzlar (DE); Frank Eisenkraemer, Solms (DE)

(73) Assignee: LEICA MICROSYSTEMS CMS GMBH, Wetzlar (DE)

( * ) Notice: Subject to any disclaimer, the term of this patent is extended or adjusted under 35 U.S.C. 154(b) by 177 days.

(21) Appl. No.: 15/770,807

(22) PCT Filed: Oct. 28, 2016

(86) PCT No.: PCT/EP2016/076119
§ 371 (c)(1),
(2) Date: Aug. 29, 2018

(87) PCT Pub. No.: WO2017/072315
PCT Pub. Date: May 4, 2017

(65) Prior Publication Data
US 2018/0364465 A1    Dec. 20, 2018

(30) Foreign Application Priority Data

Oct. 29, 2015   (DE) .................. 10 2015 118 483

(51) Int. Cl.
*G02B 21/02*   (2006.01)
*G02B 27/14*   (2006.01)
*G02B 21/36*   (2006.01)

(52) U.S. Cl.
CPC .......... *G02B 21/02* (2013.01); *G02B 27/142* (2013.01); *G02B 21/36* (2013.01)

(58) Field of Classification Search
CPC ...... G02B 21/02; G02B 27/142; G02B 21/36; G02B 27/14
See application file for complete search history.

(56) References Cited

U.S. PATENT DOCUMENTS

| 4,639,139 A | 1/1987 | Wyant et al. |
| 4,948,253 A * | 8/1990 | Biegen ............... G01B 11/2408 356/495 |
| 5,166,751 A | 11/1992 | Massig |

(Continued)

FOREIGN PATENT DOCUMENTS

| DE | 3942896 A1 | 6/1991 |
| EP | 0612414 B1 | 8/1994 |

(Continued)

*Primary Examiner* — Balram T Parbadia
(74) *Attorney, Agent, or Firm* — Leydig, Voit & Mayer, Ltd.

(57) ABSTRACT

A Mirau interference objective includes an objective lens and a splitter element arranged between the objective lens and an object to be examined. The splitter element is configured to split an incident light beam into a sample beam path and a reference beam path. The objective lens is configured to focus the sample beam path on the object to be examined. A mirror element is arranged between the splitter element and the objective lens. The mirror element is configured to reflect the reference beam path. A phase shift compensating element is configured to compensate for a wavelength-dependent phase shift between the reference beam path and the sample beam path which is superposed on the reference beam path.

16 Claims, 9 Drawing Sheets

(56) References Cited

U.S. PATENT DOCUMENTS

| | | | | |
|---|---|---|---|---|
| 5,208,451 A * | 5/1993 | Deck | ................ | G01B 9/04 |
| | | | | 250/201.3 |
| 5,589,938 A * | 12/1996 | Deck | ................ | G01B 9/02076 |
| | | | | 356/497 |
| 6,538,809 B1 | 3/2003 | Stankewitz | | |
| 7,428,057 B2 * | 9/2008 | De Lega | ................ | G01B 9/023 |
| | | | | 356/497 |
| 8,072,610 B1 | 12/2011 | Schmit et al. | | |
| 2008/0180679 A1 * | 7/2008 | de Groot | ................ | G01B 9/02007 |
| | | | | 356/450 |
| 2010/0238455 A1 * | 9/2010 | de Groot | ................ | G01B 9/02069 |
| | | | | 356/512 |
| 2011/0109820 A1 | 5/2011 | Silverstein et al. | | |
| 2011/0222069 A1 * | 9/2011 | Nagahama | ................ | G01B 9/02057 |
| | | | | 356/496 |

FOREIGN PATENT DOCUMENTS

| | | | |
|---|---|---|---|
| EP | 2369293 | A1 | 9/2011 |
| WO | WO 9407165 | A1 | 3/1994 |
| WO | WO 9960431 | A1 | 11/1999 |

* cited by examiner

| Layer | Material | Refractive index | Thickness [nm] |
|---|---|---|---|
| | | Substrate | |
| 1 | SiO2 | 1.5 | 28 |
| 2 | Ta2O5 | 2.1 | 13 |
| 3 | SiO2 | 1.5 | 39 |
| 4 | Ta2O5 | 2.1 | 33 |
| 5 | SiO2 | 1.5 | 108 |
| 6 | Ta2O5 | 2.1 | 56 |
| | | Air | |

MIRAU INTERFERENCE OBJECTIVE

CROSS-REFERENCE TO PRIOR APPLICATIONS

This application is a U.S. National Stage Application under 35 U.S.C. § 371 of International Application No. PCT/EP2016/076119 filed on Oct. 28, 2016, and claims benefit to German Patent Application No. DE 10 2015 118 483.4 filed on Oct. 29, 2015. The International Application was published in German on May 4, 2017 as WO 2017/072315 A1 under PCT Article 21(2).

FIELD

The present invention relates to a Mirau interference objective comprising an objective lens, a splitter element arranged between the objective lens and an object to be examined in order to split incident light into a sample beam path and a reference beam path, the objective lens focusing the sample beam path onto the object to be examined, and comprising a mirror element, arranged between the splitter element and the objective lens, for reflecting the reference beam path.

BACKGROUND

Figure 1:
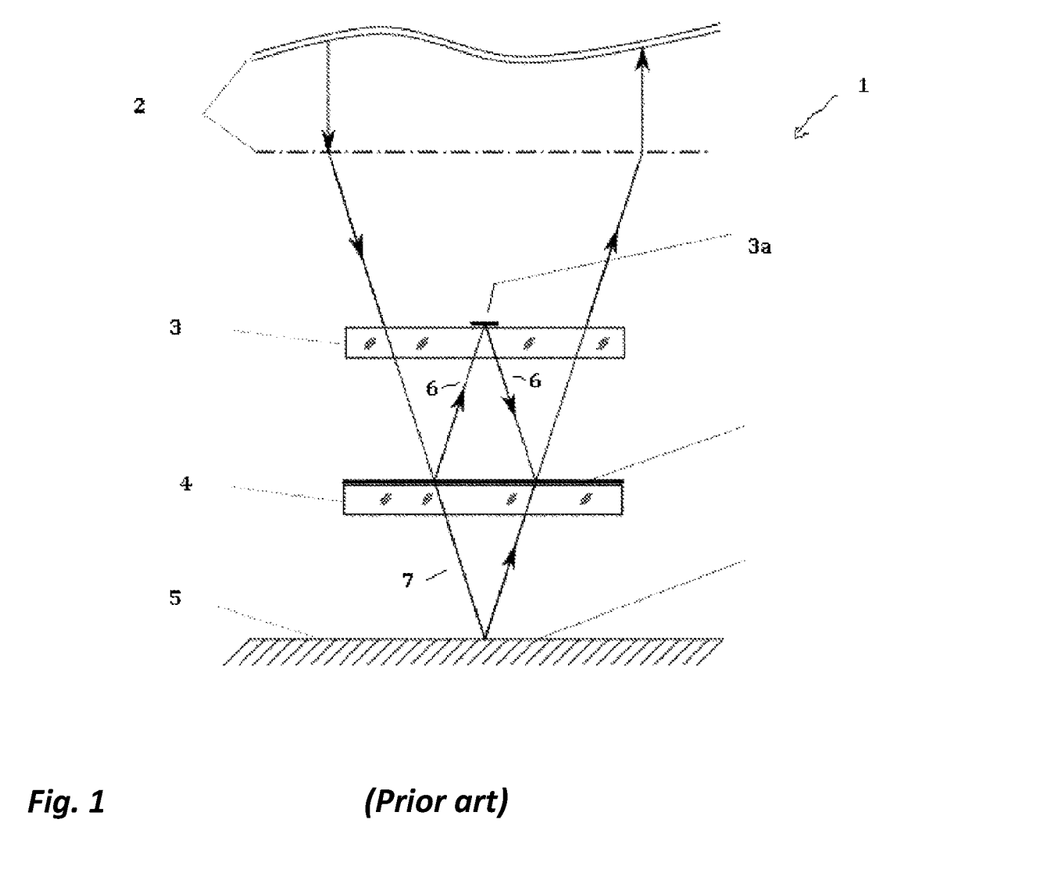
FIG. 1 is a schematic view of a known Mirau objective.

A Mirau interference objective of the type in question is known from EP 0 612 414 B1 and is shown schematically in FIG. 1. The interference objective 1 comprises an objective lens 2 having an attachment consisting of a mirror element 3 and a splitter element 4. The mirror element 3 faces the objective lens 2, while the splitter element 4 faces the object 5. The mirror element 3 consists of an optically transparent panel having a reflecting part (reference mirror) 3a, which is arranged on the optical axis. Part of the light penetrating the mirror element 3 and impinging on the splitter element 4 is reflected by the splitter element 4 as the reference beam path 6 and reaches the reflecting part 3a of the mirror element 3. The light reflected therefrom reaches the splitter element 4 and is reflected in part back to the transparent part of the mirror element 3, wherefrom the reference beam path 6 reaches the objective lens 2. The part of the light coming from the objective that is not reflected by the splitter element 4 passes through the splitter element 4 as a transmitted beam and is focused, as the sample beam path 7, on the object 5 to be measured. After the sample beam path 7 is reflected by the object 5, said beam path penetrates the splitter element 4 and also reaches the objective lens 2 therefrom. The sample beam and the reference beam are superposed after the sample beam has penetrated the splitter element 4. Both of the light beams are subject to interference. The interference pattern produced can be imaged microscopically. The microstructure of the measured object 5 can thus be shown in three dimensions by scanning the object 5 and analyzing the interference pattern.

In known interference microscope methods that use a Mirau objective of this kind, it has proven to be disadvantageous that the objects to be examined may have greatly varying reflection values. The brightness of the sample beam path therefore varies greatly depending on the object to be measured, whereas the brightness of the reference beam path reflected at the reflecting spot of the mirror element remains constant irrespective of the object to be measured. However, the interference between two partial beams of different brightnesses leads to poor contrasts, as is well known.

In order to remedy this disadvantage, the above-mentioned EP 0 612 414 B1 proposes using a variable carrier having a plurality of different splitter elements that are different with regard to their respective reflection/transmission characteristics, such that depending on the relevant reflectivity of the object to be measured, a suitable splitter element can optionally be inserted into the beam path. In this way, the brightnesses of the reference beam path and the sample beam path, respectively, can be kept as consistent as possible even in the case of objects having different reflections, in order to achieve an optimal contrast.

An interference microscope having a Mirau objective is also known from EP 2 369 293 A1. The sample to be examined is illuminated by means of a broad wavelength spectrum, for example white light. In a "focused position" defined in this document, the optical path length of the sample beam path is equal to the optical path length of the reference beam path for a conventional Mirau objective. The sample beam and the reference beam are superposed in the same phase and produce an ideal interference pattern having high intensity. However, this has a negative effect when measuring objects having regions of high reflectivity and regions of low reflectivity, as a brightness occurring in an object region of low reflectivity can lead to overload in an object region of high reflectivity. Therefore, the above-mentioned EP 2 369 293 A1 proposes a 90° phase-shifting element ("phase difference control member") that can be attached to the splitter element or the mirror element in the form of a dielectric layer. When the sample beam and the reference beam are superposed, the 90° phase-shifting element produces a phase shift between the sample beam path and the reference beam path of 180° in total.

The resulting brightness of the interference pattern is therefore minimal, such that the above-mentioned overload in the case of reflection from highly reflective sample parts can be prevented.

U.S. Pat. No. 8,072,610 B1 discusses a Mirau interferometer for use in geometric phase shift interferometry. The splitter element of a Mirau objective is replaced by two achromatic λ/4 plates, the second λ/4 plate that faces the object comprising on the upper side thereof a thin, reflective layer having a reflectivity of 50%, in order to obtain a beam splitter. The reflective mirror surface required for the reference beam may be directly attached to the front surface of the objective or to a mirror element that is arranged between the objective and the first λ/4 plate. In the interferometry method of the above-mentioned U.S. Pat. No. 8,072,610 B1, white, linearly polarized light, for example, is conducted towards the object via the objective. In the above-mentioned embodiment of the splitter element, the plane of polarization of the reference beam path remains unchanged when said beam path reenters the objective, whereas the plane of polarization of the sample beam path is rotated by 90°. After penetrating the objective, the two mutually orthogonally polarized beam paths are conducted to a CCD camera via a beam splitter and through an achromatic phase shifter.

Finally, a Mirau interferometer is also known from U.S. Pat. No. 4,639,139, in which the mirror element can be moved between the objective and the splitter element in the direction of the optical axis by means of a piezoelectric drive. The obtained interference pattern is focused onto a photocell array, the output signal of which is integrated in each case by means of a phase shift by 90° caused by the mirror element being shifted.

SUMMARY

In an embodiment, the present invention provides a Mirau interference objective including an objective lens and a splitter element arranged between the objective lens and an object to be examined. The splitter element is configured to split an incident light beam into a sample beam path and a reference beam path. The objective lens is configured to focus the sample beam path on the object to be examined. A mirror element is arranged between the splitter element and the objective lens. The mirror element is configured to reflect the reference beam path. A phase shift compensating element is configured to compensate for a wavelength-dependent phase shift between the reference beam path and the sample beam path which is superposed on the reference beam path.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Embodiments of the present invention are able to further increase, in the case of a Mirau objective, the contrast of the obtained interference pattern when a broad-band light source, for example white light, is used.

Up to now, the prior art has not recognized that the splitter elements used, and to a small extent the mirror elements used, produce a phase retardation that varies over the wavelength. In addition, each sample has a wavelength-dependent phase response that is typical for the material. The problem of phase retardation varying over the wavelength occurs in particular in samples that have thin layers, for example optical filters. This results in a wavelength-dependent phase difference between the sample beam path and the reference beam path when said beam paths superpose.

As described in detail below, this may result in a significant decrease in contrast, even if the sample beam path and reference beam path are equally bright, which makes it significantly more difficult to analyze the interferences.

The Mirau interference objective according to an embodiment of the invention comprises an objective lens, a splitter element arranged between the objective lens and an object to be examined in order to split incident light into a sample beam path and a reference beam path, the objective lens focusing the sample beam path onto the object to be examined, and a mirror element arranged between the splitter element and the objective lens in order to reflect the reference beam path.

The objective lens mentioned is usually an arrangement of a plurality of lenses or lens groups; however, in principle, it may also be an individual lens. According to an embodiment of the invention, a Mirau interference objective of this known kind contains a phase shift compensating element, which compensates for a wavelength-dependent phase shift between the reference beam path and the sample beam path that superposes the reference beam path.

In this case, the phase shift compensating element is formed, particularly advantageously, as a thin-layer system, which is attached to the splitter element.

In this way, said wavelength-dependent phase shifts, which are produced by the splitter element and/or the mirror element and/or the object to be examined itself, can be eliminated effectively and the contrast can be significantly improved.

Advantages of the Invention

In order to explain the invention, the basic principles thereof are described first. The Mirau interference objectives discussed here, also called Mirau objectives in the following, usually operate using broad-band light of a specific wavelength range, typically using white light. In order that a white light interference can be produced, the path difference between superposed beam paths must be smaller than the coherence length:

$$l_k = \frac{\lambda_C^2}{\Delta \lambda}$$

A band width of typically $\Delta\lambda \approx 200$ nm and a central wavelength of the spectrum, $\lambda_c = 530$ nm, results in a coherence length of 2-3 µm, which corresponds to only a few wave trains.

It is important for use that the best possible interference contrast, K, is produced in the image plane. In order to achieve this, the same intensity, $I_R$, must return from the reference branch as from the sample, $I_P$. In order to achieve this, a variable Mirau beam splitter, for example according to the above-mentioned EP 0 612 414 B1, is used.

In this case, the contrast is improved in that different splitters having different split ratios can be pivoted in and the Mirau attachment can thus be adapted to the reflectivity of the sample.

In the case of observation of this kind, the fact that the light of both beam paths must be superposed in phase is not taken into consideration.

Specifically, the reflection at the splitter, $R_t$, the transmission at the splitter, $T_t$, the reflection at the reference mirror, $R_r$, and the reflection at the sample, $R_p$, not only change the amplitude of the reflected light, but also influence the phase:

$$R_t = \hat{R}_t * e^{i(\omega t + \Phi_{Rt}(x,y,\lambda))}$$

$$T_t = \hat{T}_t * e^{i(\omega t + \Phi_{Tt}(x,y,\lambda))}$$

$$R_p = \hat{R}_p * e^{i(\omega t + \Phi_p(x,y,\lambda))}$$

$$R_r = \hat{R}_r * e^{i(\omega t + \Phi_r(x,y,\lambda))}$$

The E field, $E_R$, of the reference beam path then results from $$E_R = R_t * R_r * R_t = \hat{R}_t * \hat{R}_r * \hat{R}_t e^{i(\omega t + \Phi_{Rt}(x,y,\lambda) + \Phi_r(x,y,\lambda) + \Phi_{Rt}(x,y,\lambda))}$$

The E field, $E_P$, of the sample beam path then results from $$E_P = T_t * R_p * T_t = \hat{T}_t * \hat{R}_p * \hat{T}_t * e^{i(\omega t + \Phi_{Tt}(x,y,\lambda) + \Phi_p(x,y,\lambda) + \Phi_{Tt}(x,y,\lambda))}$$

If the two beam paths then superpose again, the resulting E field is produced $$E_S = E_R + E_P$$

$$I = |(E_R + E_P)^2|$$

$$I_{max} = \hat{E}_R^2 + \hat{E}_P^2 + 2 * \hat{E}_R \hat{E}_P \cos(\Delta\Phi(x,y,\lambda))$$

$$I_{min} = \hat{E}_R^2 + \hat{E}_P^2 - 2 * \hat{E}_R \hat{E}_P \cos(\Delta\Phi(x,y,\lambda))$$

$$\Delta\Phi(x,y,\lambda) = \Phi_{Tt}(x,y,\lambda) + \Phi_p(x,y,\lambda) + \Phi_{Tt}(x,y,\lambda) - \Phi_{Rt}(x,y,\lambda) - \Phi_r(x,y,\lambda) - \Phi_{Rt}(x,y,\lambda)$$

In this case, the location dependence in the xy plane is unimportant for further observation:

$$\Delta\Phi(\lambda) = \Phi_{Tt}(\lambda) + \Phi_p(\lambda) + \Phi_{Tt}(\lambda) - \Phi_{Rt}(\lambda) - \Phi_r(\lambda) - \Phi_{Rt}(\lambda)$$

$$\Delta\Phi(\lambda) = 2 * \Phi_{Tt}(\lambda) + \Phi_p(\lambda) - 2 * \Phi_{Rt}(\lambda) - \Phi_r(\lambda)$$

In which $I_{max}$ and $I_{min}$ are the intensity in the case of the maximum and minimum interference contrast, respectively. The contrast, K, is determined by:

$$K = \frac{I_{max} - I_{min}}{I_{max} + I_{min}}$$

$$K(\lambda) = \frac{4 * \hat{E}_R \hat{E}_P \cos(\Delta\Phi(\lambda))}{2 * (\hat{E}_R^2 + \hat{E}_P^2)}$$

EP 0 612 414 B1 implicitly assumes that the phase difference is $\Delta\Phi(\lambda) = \text{const}$.

An optimal contrast is therefore achieved when the light intensity of the reference beam and the sample beam, respectively, is exactly the same: $\hat{E}_R^2 = \hat{E}_P^2$, (Intensity is proportional to the square of amplitude). It is therefore possible to adapt the contrast ideally to the sample by means of splitters each having a different reflectivity.

It is clear from the formula for $K(\lambda)$ that a phase difference can influence the contrast to a significant extent; it even dominates over the loss in contrast due to fluctuations in intensity. The present invention intends to keep the wavelength-dependent part of the contrast, $\cos(\Delta\Phi(x,y,\lambda))$, constant and thus to maximize said part. The latter is equivalent to the condition $\Delta\Phi(\lambda) = \pi$ if the contrast maximum is in the intensity minimum, or $$\Delta\Phi(\lambda) = 0$$

if the contrast minimum is in the intensity maximum.

The invention can initially neutralize said effect of a phase shift that varies over the wavelength for the interference objective, irrespective of the object to be examined. Proceeding from a neutral sample, i.e. an object that has a wavelength-independent reflectivity, the splitter element and/or the mirror element are designed, by means of the phase shift compensating element, to be neutral, i.e. any phase shifts of the sample beam path and/or reference beam path are wavelength-independent. As the phase shift should ideally be wavelength-independent in the reference beam path, in practice often only the splitter element is designed to be neutral.

Interference objectives of this kind can therefore be advantageously used in particular for neutral samples. For samples having wavelength-dependent reflectivity, such as thin-layered samples, optimized interference objectives should be used for each sample, according to the invention, as is described further below.

Interference objectives can be produced particularly advantageously by using an attachment ("Mirau cap"). An attachment of this kind contains the splitter element, the mirror element and the phase shift compensating element, the attachment being formed by suitable fastening means such that said attachment can be attached to the objective lens in particular so as to be detachable.

The phase shift compensating element may be attached to the splitter element, for example in the form of a coating, may be a component thereof, or ultimately may form the splitter element itself. If the splitter element is equipped with the phase shift compensating element in this way, specific splitter elements can be used for different samples, which splitter elements are arranged in a slide or a wheel, variable carriers in general, such that they can be inserted into the beam path in a manner that is adapted to the examined sample.

In addition, splitter elements that are variable with regard to reflectivity and transmittance can be used depending on the object to be examined, as proposed in EP 0 612 414 B1. The contrast of the interference image can thus be optimized with regard to both the phase shift and the intensities of the reference beam path and the sample beam path.

As a result, the white light interference contrast is significantly increased.

Additionally or alternatively, the phase shift compensating element may be attached to the mirror element, may be a component thereof, or may form the mirror element itself "Mirror element" within the context of this application refers to an element that is used in the Mirau objective to reflect the reference beam path. If the reflecting surface is located on the objective lens (in particular on the front lens thereof), "mirror element" refers to this reflecting surface.

If there is a mirror element irrespective of the objective lens, "mirror element" refers to the element having the reflecting surface, which element is usually an optically transparent panel, in the center of which the reflecting surface is located. For example, the mirror element or the part of the mirror element that reflects the reference beam path may be made of the same material as the object to be examined. In this way, any phase shift produced in the sample beam path would be canceled out by wavelength-dependent reflectivity from the object having the corresponding phase shift of the reference beam when reflected at the mirror element. If the splitter element is formed such that it does not induce a further wavelength-dependent phase shift between the reference beam path and the sample beam path, this measure alone would be sufficient for effective phase shift compensation.

The mirror element may be formed as part of the objective lens. In particular, the mirror element or the part of the mirror element that reflects the reference beam path may be attached to the front lens on the object side, for example vapor-deposited thereon.

In order to compensate for the wavelength-dependent phase shift between the reference beam path and the sample beam path superposed thereon, the phase shift compensating element shifts the phase of the reference beam path and/or of the sample beam path such that the resulting phase shift has a constant value or at least one near-constant value having maximum deviations of ±20%, in particular ±10%, over a defined wavelength range independently of the wavelength. This defined wavelength range is preferably the wavelength range observed in the relevant case of application, but in particular the predominant part of the observed wavelength range. The observed wavelength range extends specifically to a range of between 450 nm and 630 nm, for example; the predominant part of this range is then a range of between 530 nm and 630 nm, for example (cf. embodiments below). In this way, the contrast over the observed wavelengths is constant. Preferably, the constant value is 0 or Π, since the contrast reaches its maximum in this case. In practice, the most constant value possible is aimed for over the entire observed wavelength range. In this case, various influences are considered, such as differences in thickness, glass properties (e.g. dispersion), and wedge errors between the splitter and the mirror. Of course, minor deviations may be permitted in this case as long as significant increases in contrast are still noticeable. More details on the design and function of the phase shift compensating element according to the invention can be found in the embodiments.

The Mirau interference objective according to an embodiment of the invention is in particular an interference microscope objective. In this case, the splitter element, the mirror element and the phase shift compensating element may be components of an attachment (or a cap) that is designed by means of fastening elements such that said attachment can be in particular detachably attached to the microscope objective.

According to an embodiment of this invention, a corresponding attachment for a microscope objective is provided.

The features mentioned above and the features to be explained in the following can be used not only in the combination given in each case, but also in other combinations or in isolation, without departing from the scope of the present invention.

FIG. 1 has already been discussed in detail in the introductory part of the description and shows a conventional Mirau objective. However, a Mirau objective of this kind shows, as has been explained in detail, a wavelength-dependent phase shift between the reference beam path and the sample beam path superposed thereon.

In the following, the cause and significance of this phase shift will be explained with reference to examples of materials.

Figure 2:
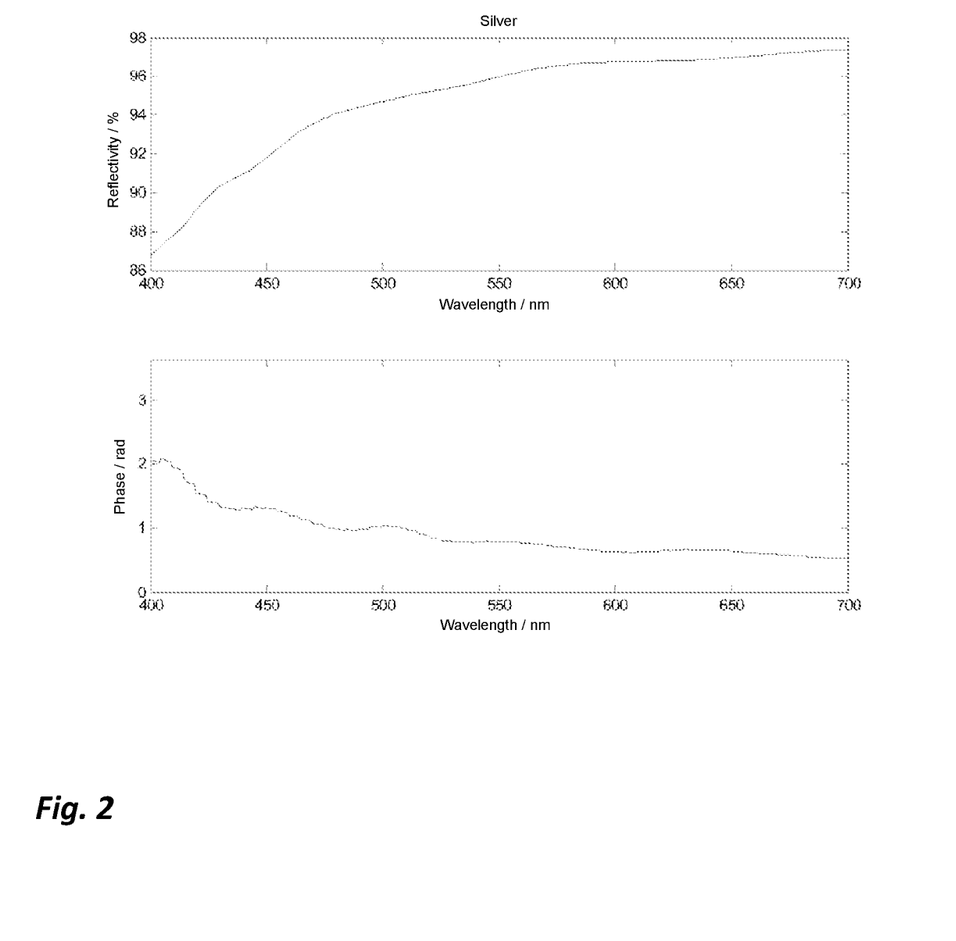
FIG. 2 shows two diagrams of the reflectivity and the phase shift, respectively, for silver, depending on the wavelength.

The upper diagram of FIG. 2 shows the reflectivity, given in percent (%), of silver depending on the wavelength, given in nm.

The wavelength range of white light, from 400 nm (violet) to 700 nm (red), is shown. The central wavelength is approximately 530 nm (green). The reflectivity of silver increases at higher wavelengths, as can be seen in the upper diagram of FIG. 2. The lower diagram of FIG. 2 shows a phase shift ("Phase"), in rad, of light reflected by silver, depending on the wavelength. In this case, "phase shift" is defined as the change in phase position of the beam path after reflection or transmission at an optical interface. 2Π rad is 360°, and therefore 1 rad is approximately 57.3°. The phase shift decreases, starting from approximately 2 rad, towards higher wavelengths (up to approximately 0.5 rad). For interfaces made of materials having a complex refractive index (e.g. in the case of metals), the phase response becomes apparent depending on the wavelength of the rays and the angle of incidence. In the wavelength range above the central wavelength, the phase shift varies only minimally, whereas in the lower wavelength range, the phase shift depends somewhat more on the wavelength.

Figure 3:
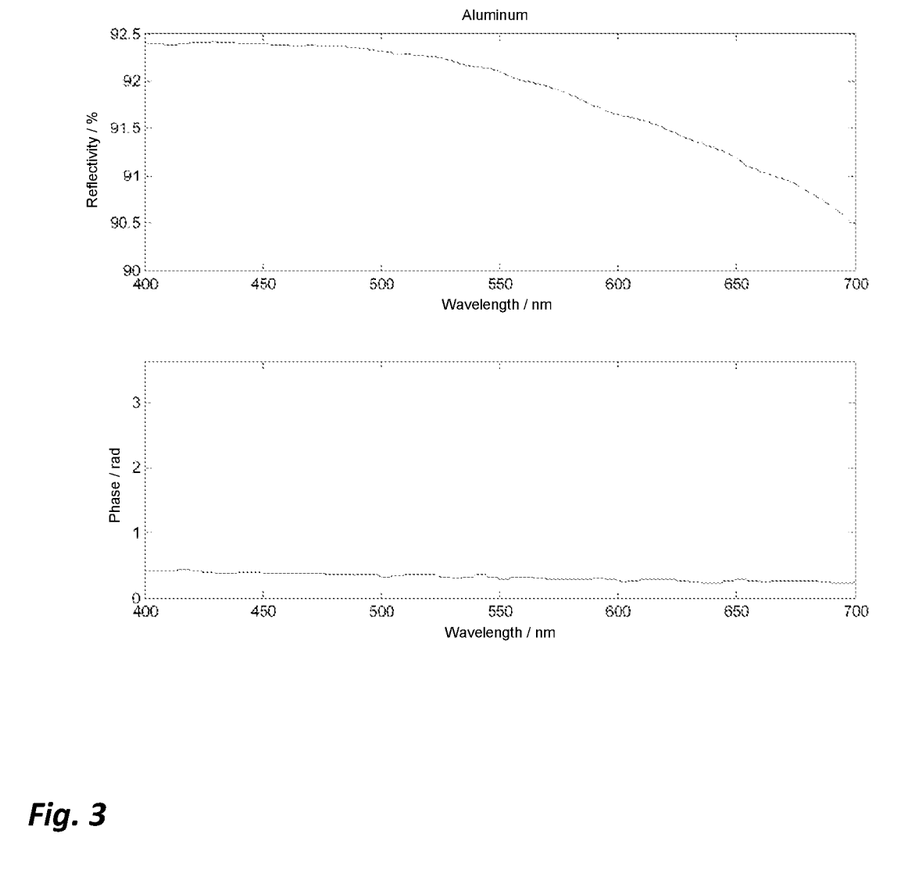
FIG. 3 shows two diagrams of the reflectivity and the phase shift, respectively, for aluminum, depending on the wavelength.

FIG. 3 shows the diagrams from FIG. 2 for the material aluminum. Whereas in the lower wavelength range, the reflectivity is minimally wavelength-dependent, said reflectivity decreases slightly for higher wavelengths. It should be noted that the reflectivity in the observed wavelength range varies only between 90.5% and approximately 92.5%, whereas there is a greater variation for silver (see FIG. 2).

The sequence of the phase shift shows an only very minimally varying sequence at a near-constant value of approximately 0.3 to 0.4 rad for aluminum in the observed wavelength range.

Figure 4:
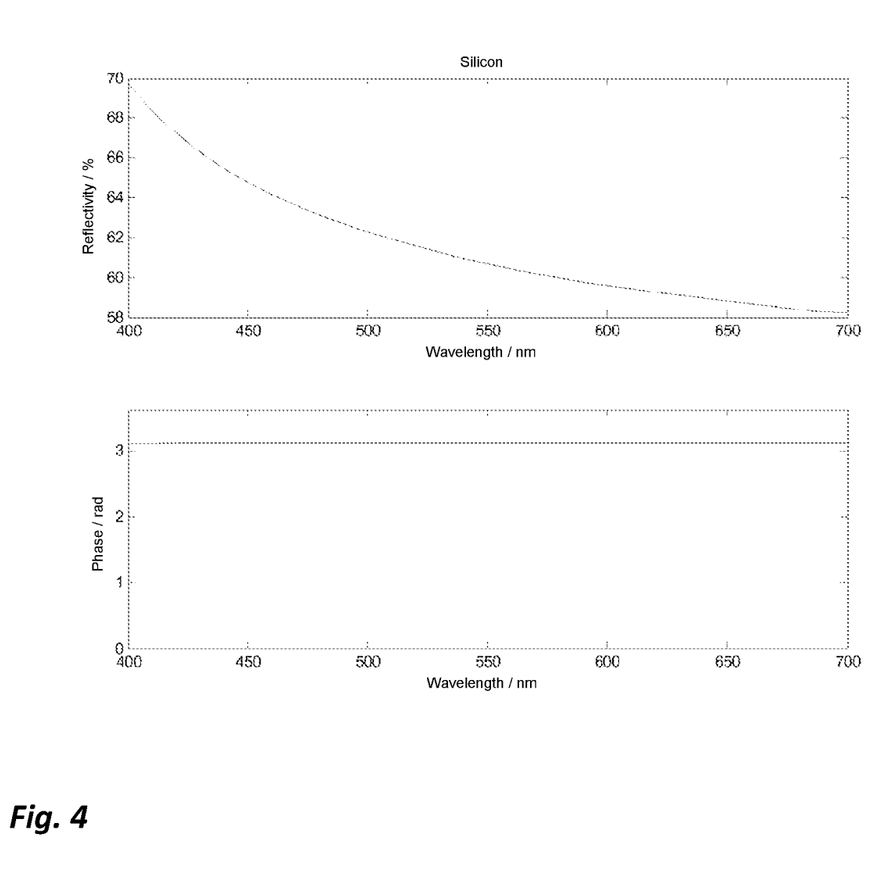
FIG. 4 shows two diagrams of the reflectivity and the phase shift, respectively, for silicon, depending on the wavelength.

The upper diagram of FIG. 4 shows a reflectivity for silicon that greatly decreases towards higher wavelengths. Said reflectivity decreases from 70% at 400 nm to approximately 58% at 700 nm. However, the phase shift has a near-constant progression over the entire observed wavelength range with a value of just over 3 rad.

Figure 5:
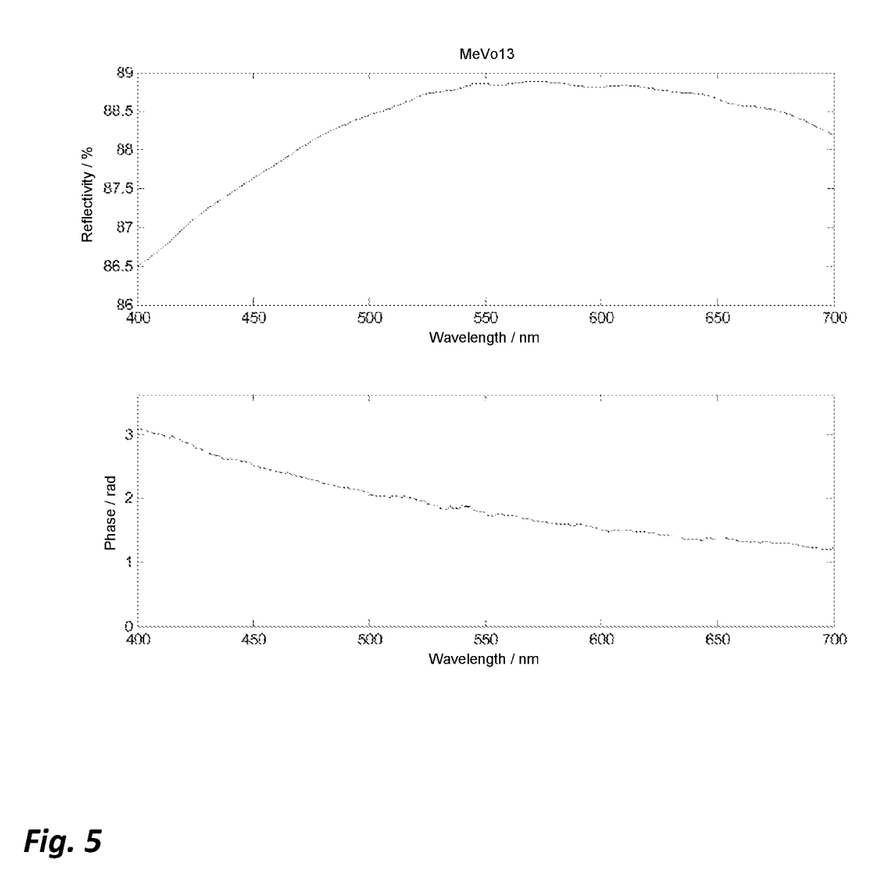
FIG. 5 shows two diagrams of the reflectivity and the phase shift, respectively, for aluminum having a dielectric protective layer, depending on the wavelength.

FIG. 5 shows analogous diagrams for aluminum having a simple dielectric protective layer. This is a typical mirror for laser applications and optical applications. In practice, a dielectric protective layer is always necessary, as aluminum would oxidize in its pure form. Therefore, the curves for aluminum shown in FIG. 3 cannot be achieved in practice. Due to the relatively minimal and near-constant phase shift over the entire observed wavelength range, aluminum would be more suitable than the protective layer shown in FIG. 5. The reflectivity of this protective layer increases towards the central wavelength from approximately 86.5% to just under 89% and decreases minimally at higher wavelengths. The phase shift decreases relatively continuously from approximately 3 rad to approximately 1 rad over the observed wavelength range. Therefore, both the wavelength dependency and the extent of the phase shift are more clearly defined for this protective layer than for aluminum.

FIGS. 2 to 5 therefore show the extent and the wavelength dependency of the phase shift when different materials are used, for example, as samples to be examined or as a reflecting part of a mirror element in the Mirau objective. It appears that the assumption made implicitly in the prior art to date that the phase shift has a constant wavelength-independent value is incorrect for several materials.

Figure 6:
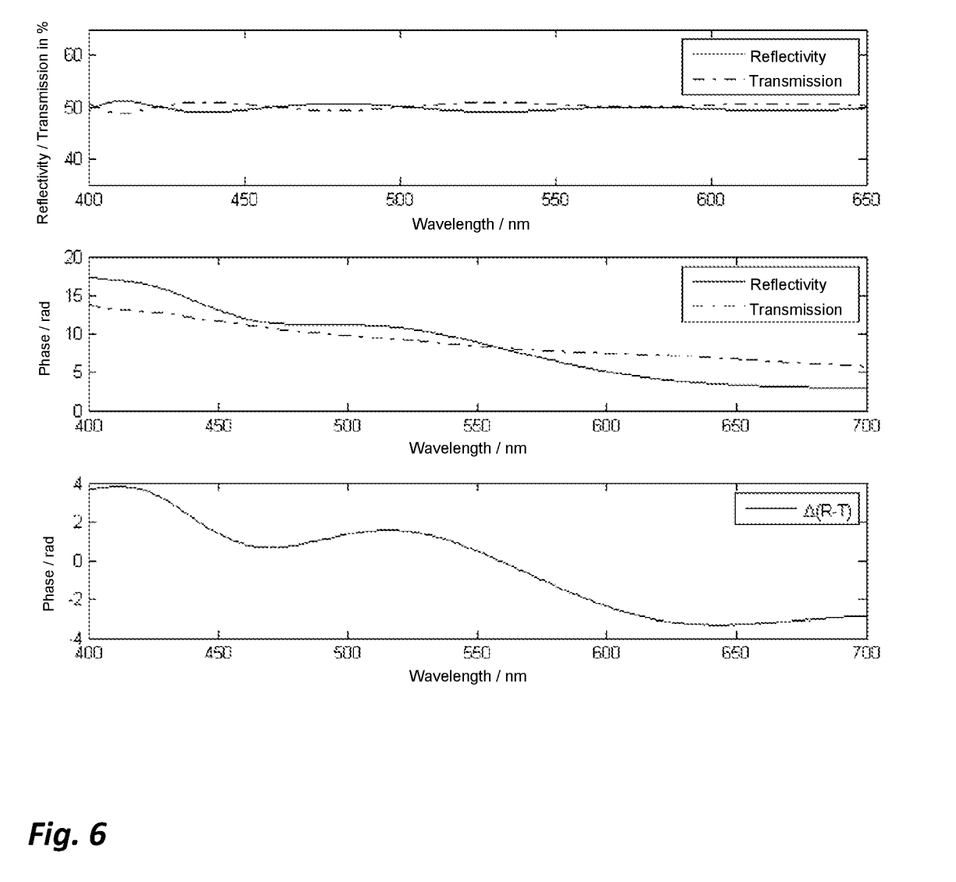
FIG. 6 shows three diagrams of the reflectivity, the relevant phase shift and the phase difference resulting therefrom, respectively, for a typical multilayer 50:50 splitter element, depending on the wavelength.

FIG. 6 shows a typical multilayer 50:50 splitter layer, which is often also used as a splitter element in Mirau objectives. The reflectivity and the transmissivity are both in a narrow range of around 50% over the entire wavelength range shown.

Splitter layers are therefore optimized to an optimal ratio of the transmitted intensity to the reflected intensity. The intensity ratio varies over the observed wavelength range by only a few percentage points. However, the individual phase shifts for the reflectivity (solid line) and the transmissivity (dashed line) vary significantly over the entire wavelength range shown, and the phase shift between the reflected and transmitted portion, i.e. the phase difference that is shown in the lowermost diagram in FIG. 7, also varies correspondingly.

In particular, in the range of lower and higher wavelengths, the absolute differences in the respective phase shifts are several rad, in some cases up to 4 rad. It should be noted here that the splitter layer involves a factor of 2, as this layer reflects twice (reference beam path) and transmits twice (sample beam path).

FIG. 6 therefore shows that when a conventional dielectric splitter layer is used, a highly wavelength-dependent phase shift between the sample beam path and the reference beam path occurs solely due to the splitter element in the Mirau objective. A wavelength-dependent phase shift can occur when the reference beam path is reflected by the reflecting part of the mirror element and an additional wavelength-dependent phase shift of the sample beam path can occur when reflected by the sample to be examined.

Figure 7:
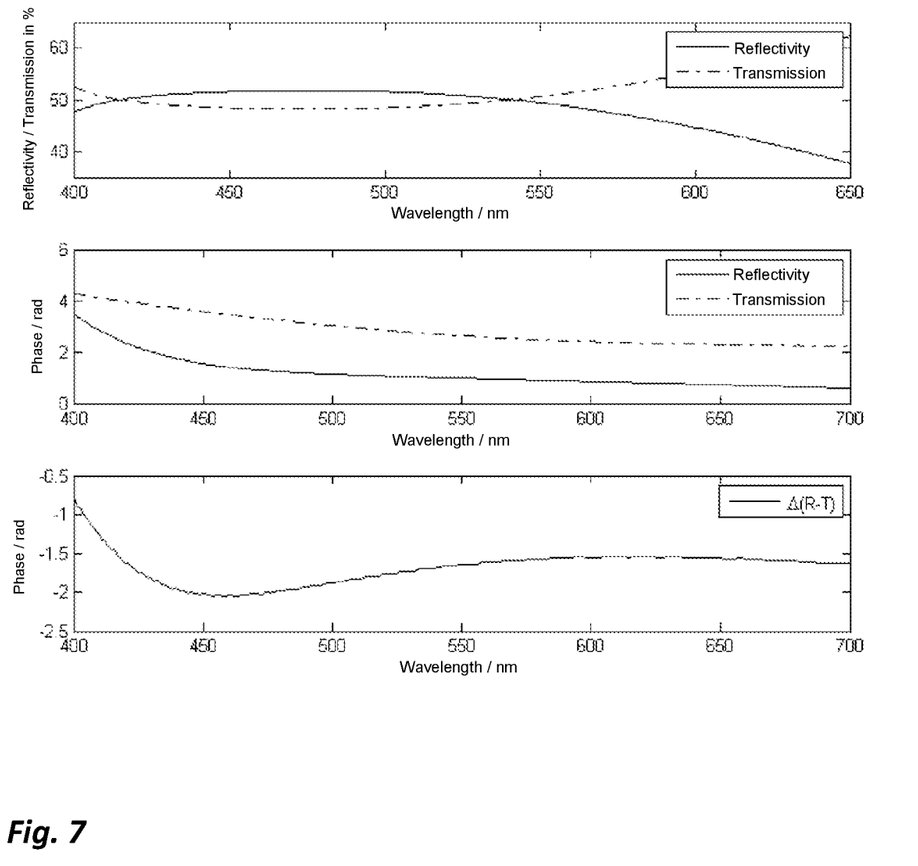
FIG. 7 shows three diagrams of the reflectivity, the relevant phase shift and the phase difference resulting therefrom, respectively, for an optimized splitter layer according to an embodiment of the invention having a phase shift compensating element, depending on the wavelength.

FIG. 7 shows the reflectivity, the respective phase shifts and the phase difference, respectively, of a phase shift compensating element, which element has been achieved by means of a splitter layer optimized according to the invention. Reflection (solid line) and transmission (dashed line) are in a narrow range of around 50% up to approximately 550 nm; towards higher wavelengths, there is a growing difference between reflection and transmission. However, it can be seen from the two lower diagrams of each of the phase shifts and the phase difference, respectively, that, for both the reflected portion and the transmitted portion, the extent and fluctuation over the observed wavelength range is significantly lower than in the corresponding diagram in FIG. 6. In particular, the difference between the two shown phase shifts in the wavelength range, observed in the present application, of between 450 nm and 650 nm, in particular in the range of between 500 nm and 630 nm, more particularly in the range of between 530 nm and 630 nm, is less than approximately 2 rad and is, in the predominant wavelength range, absolutely near-constantly approximately 1.5 rad, i.e. is significantly lower and varies less over the wavelength than for a conventional splitter layer.

A corresponding splitter element having a vapor-deposited phase shift compensating element is therefore best suited to compensate for the wavelength-dependent phase shift between the reference beam path and the sample beam path superposed thereon.

The splitter element shown is therefore designed for use with neutral samples.

In summary, it is evident that the conventional splitter layers of splitter elements have a significant gradient when silicon and glass are examined as samples. With the new layer according to FIG. 7, the gradient is symmetrical around the black contrast minimum.

For non-neutral samples, i.e. samples having a wavelength-dependent phase shift of the sample beam path, the phase shift compensating element can be further optimized to the splitter element.

It is often sufficient to distinguish between dielectric and metal samples and to provide corresponding Mirau attachments (Mirau caps) with optimized splitter layers.

Figure 8:
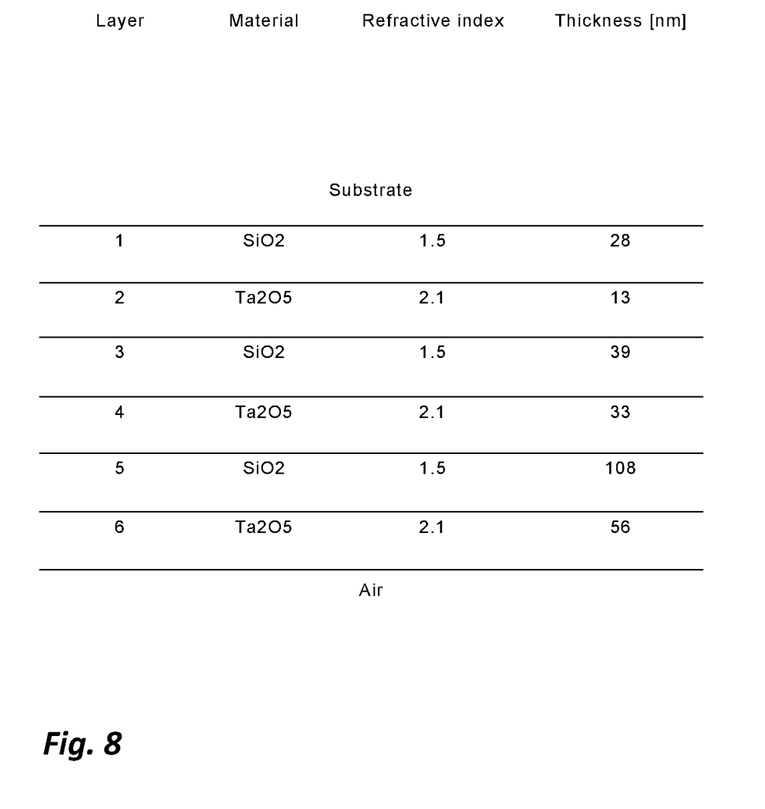
FIG. 8 shows the layer structure of the optimized splitter layer of the phase shift compensating element.

FIG. 8 shows an example of the layer structure of an optimized splitter layer of the phase shift compensating element. The splitter layer consists of six vapor-deposited layers. The six vapor-deposited layers consist alternately of $SiO_2$ and $Ta_2O_5$. The respective refractive indices and the layer thicknesses in nanometers (nm) are shown in the table. The first layer rests on the substrate, while the final sixth layer is open to the air.

Figure 9:
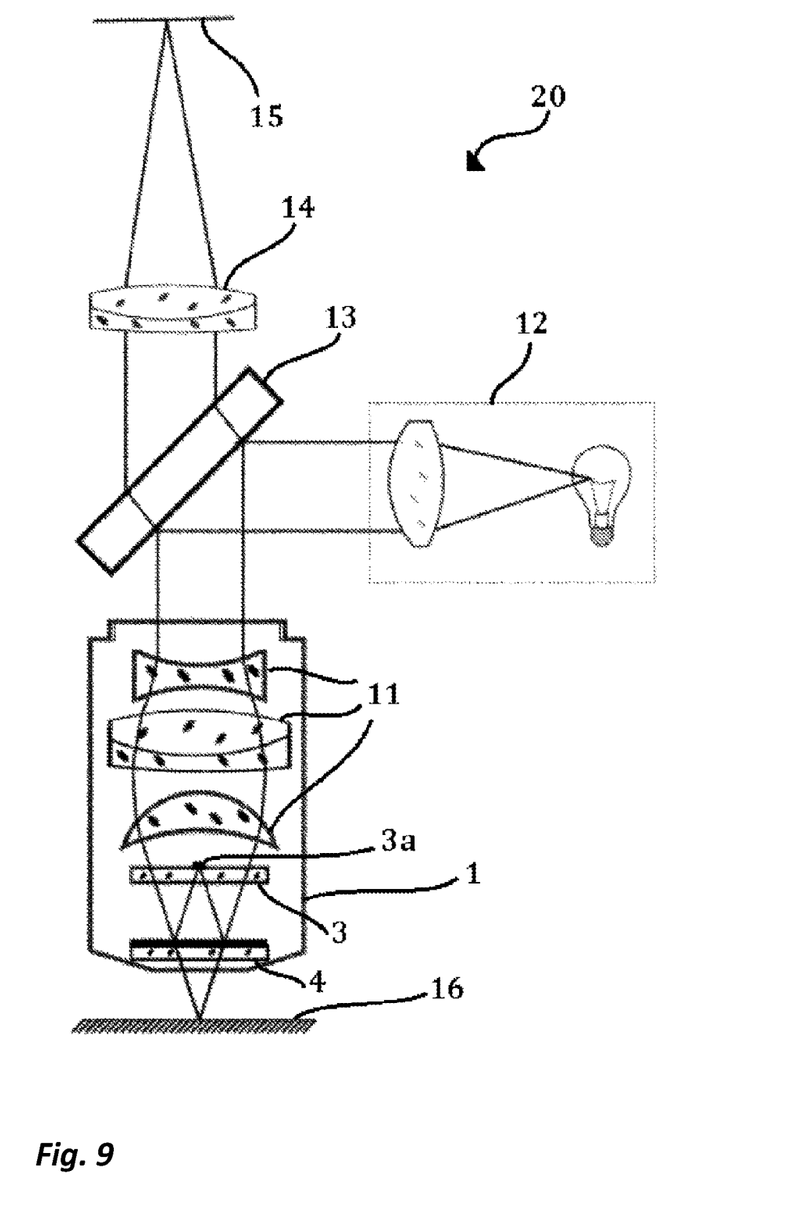
FIG. 9 shows the schematic structure of an interference microscope having a Mirau interference objective according to an embodiment of the invention.

FIG. 9 is a schematic illustration of the design of an interference microscope comprising a Mirau interference objective according to the invention.

The interference objective 1 is shown here as a homogenous objective that comprises lens assemblies 11 of the actual microscope objective and the splitter element 4 and the mirror element 3. On the optical axis of the interference objective 1, the reflecting part 3a is located on the mirror element 3. The splitter layer optimized as a phase shift compensating element according to the invention is located on the splitter element 4.

This interference objective 1 is a component of an interference microscope 20 that comprises, as essential elements, an illumination unit 12, a beam splitter 13 and a tube lens 14. The object plane is denoted by the reference numeral 16; the image plane is denoted by the reference numeral 15. Broadband (white) light emanating from the illumination unit 12 reaches the interference objective 1 via the beam splitter 13, by which interference objective the light is focused onto the object plane 16.

A sample in the object plane 16 is examined by means of interference microscopy. According to the invention, the splitter layer functioning as a phase shift compensating element causes a constant wavelength-independent phase difference between the sample beam path and the reference beam path over a large proportion of the wavelength range observed in the specific case of application.

Interference of these beam paths results in a high contrast and therefore makes it easier to analyze the interference image.

The interfered sample and reference beams reach the tube lens 14 via the beam splitter 13, by which tube lens the beams are focused onto the image plane. Consequently, the interference image can be observed, or recorded by a camera, in the image plane 15. The schematically shown lens assemblies 11 and the schematically shown tube lens 14 may be a plurality of individual lenses or a plurality of lens assemblies.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS 1 interference objective
2 objective lens 3 mirror element
3a reflecting part
4 splitter element
5 object, sample
6 reference beam path
7 sample beam path
11 lens assemblies
12 illumination assemblies
13 beam splitter
14 tube lens
15 image plane
16 object plane
20 interference microscope

The invention claimed is:

1. A Mirau interference objective comprising:
an objective lens;
a splitter layer arranged between the objective lens and an object to be examined, the splitter layer being configured to both split an incident light beam into a sample beam path and a reference beam path and to compensate for a wavelength-dependent phase shift between the reference beam path and the sample beam path which is superposed on the reference beam path, the objective lens being configured to focus the sample beam path on the object to be examined; and
a mirror element arranged between the splitter element and the objective lens, the mirror element being configured to reflect the reference beam path.

2. The interference objective according to claim 1, wherein the splitter layer is designed as a thin-layer system.

3. The interference objective according to claim 2, wherein the splitter layer comprises a plurality of alternately arranged vapor-deposited layers of $SiO_2$ and $Ta_2O_5$.

4. The interference objective according to claim 1, wherein, in order to compensate for the wavelength-dependent phase shift, the splitter layer is configured to shift the phases of the reference beam path and/or of the sample beam path such that a resulting phase difference has a constant value, independently of the wavelength, over a defined wavelength range.

5. The interference objective according to claim 4, wherein the constant value is 0 or $\pi$.

6. The interference objective according to claim 1, wherein the splitter layer is attached to the mirror element, is a component of the mirror element, or forms the mirror element.

7. The interference objective according to claim 6, wherein the splitter layer includes a same material as the object to be examined.

8. The interference objective according to claim 1, wherein the mirror element is formed as part of the objective lens.

9. The interference objective according to claim 1, wherein the objective lens is a microscope objective and the splitter layer and the mirror element are components of an attachment that is configured to be attached to the microscope objective by a fastening element.

10. An attachment for a microscope objective for forming the interference objective according to claim 1, wherein the objective lens is the microscope objective, and wherein the splitter layer and the mirror element are components of the attachment, which is configured to be attached to the microscope objective by a fastening element.

11. The interference objective according to claim 1, wherein the splitter layer is configured to shift the phases of the reference beam path and/or of the sample beam path to a different extent at different wavelengths.

12. The interference objective according to claim 1, further comprising a plurality of additional different splitter layers, each of the splitter layers being adapted to a material of the object to be examined.

13. The interference objective according to claim 12, wherein the different splitter layers are each configured to shift the phases of the reference beam path and/or of the sample beam path to a different extent at different wavelengths depending on the material of the object to be examined.

14. The interference objective according to claim 12, wherein the different splitter layers have different split ratios adapted to a reflectivity of the object to be examined over a range of observation wavelengths.

15. The interference objective according to claim 1, wherein, in order to compensate for the wavelength-dependent phase shift, the splitter layer is configured to shift the phases of the reference beam path and/or of the sample beam path such that a resulting phase difference has a maximum deviation of ±20% over a wavelength range 450 nm to 630 nm.

16. The interference objective according to claim 15, wherein the splitter layer is configured to shift the phases of the reference beam path and/or of the sample beam path such that the maximum deviation of the resulting phase difference is ±10% over a wavelength range 530 nm to 630 nm.

* * * * *